(12) United States Patent
Duan

(10) Patent No.: US 11,880,905 B2
(45) Date of Patent: Jan. 23, 2024

(54) IMAGE PROCESSING METHOD AND IMAGE PROCESSING METHOD DEVICE

(71) Applicant: BOE Technology Group Co., Ltd., Beijing (CN)

(72) Inventor: Ran Duan, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 437 days.

(21) Appl. No.: 17/355,670

(22) Filed: Jun. 23, 2021

(65) Prior Publication Data

US 2022/0172315 A1 Jun. 2, 2022

(30) Foreign Application Priority Data

Dec. 1, 2020 (CN) .......................... 202011385602.5

(51) Int. Cl.
| | |
|---|---|
| *G06T 1/20* | (2006.01) |
| *G06T 1/00* | (2006.01) |
| *G06T 7/70* | (2017.01) |
| *G06T 1/60* | (2006.01) |
| *G06V 10/75* | (2022.01) |
| *G06F 18/22* | (2023.01) |

(52) U.S. Cl.
CPC ................ *G06T 1/20* (2013.01); *G06F 18/22* (2023.01); *G06T 1/0007* (2013.01); *G06T 1/60* (2013.01); *G06T 7/70* (2017.01); *G06V 10/758* (2022.01); *G06T 2207/20021* (2013.01)

(58) Field of Classification Search
CPC ........... G06T 1/0007; G06T 1/20; G06T 1/60; G06T 2207/20021; G06T 7/70; G06V 10/50; G06V 10/758; G06F 18/22
See application file for complete search history.

(56) References Cited

U.S. PATENT DOCUMENTS

| | | | |
|---|---|---|---|
| 2007/0154095 A1* | 7/2007 | Cao ...................... | G06V 40/162 382/164 |
| 2007/0217688 A1* | 9/2007 | Sabe ................... | G06F 18/2148 382/226 |

* cited by examiner

*Primary Examiner* — Ruiping Li
(74) *Attorney, Agent, or Firm* — IPro, PLLC

(57) ABSTRACT

An image processing method and an image processing device are provided. The image processing method includes: acquiring an input image; extracting first and second pixel groups in the input image, wherein the first pixel group comprises first pixels with different positions, and the second pixel group comprises second pixels with different positions, the positions of the first pixels are different from the positions of the second pixels, the number of the first pixels are equal to the number of the second pixels, and the position of each first pixel in the first pixel group corresponds to the position of a respective second pixel in the second pixel group; when a preset similarity condition is satisfied between the first pixel and the respective second pixel, determining a first processing result of the first pixel as a second processing result of the respective second pixel.

20 Claims, 5 Drawing Sheets

IMAGE PROCESSING METHOD AND IMAGE PROCESSING METHOD DEVICE

CROSS-REFERENCE TO RELATED APPLICATIONS

The present disclosure claims priority to Chinese Patent Application No. 202011385602.5 filed in China on Dec. 1, 2020, which is incorporated herein by reference in its entirety.

TECHNICAL FIELD

The present disclosure relates to the field of display technology, and more particularly, to an image processing method and image processing device.

BACKGROUND

Image data needs to be processed when a display device displays an image. In the related art, with respect to a processing procedure for the image data, it needs to traverse each pixel in an image, and therefore, the image processing workload in the related art is large.

SUMMARY

Embodiments of the present disclosure provide an image processing method and an image processing device.

In a first aspect, embodiments of the present disclosure provide the image processing method, which includes:
  acquiring an input image;
  extracting a first pixel group and a second pixel group in the input image, wherein the first pixel group includes a plurality of first pixels whose positions are different from each other, and the second pixel group includes a plurality of second pixels whose positions are different from each other, the positions of the first pixels are different from the positions of the second pixels, the number of the first pixels are equal to the number of the second pixels, and the position of each first pixel in the first pixel group corresponds to the position of a respective second pixel in the second pixel group; and
  in the case that a preset similarity condition is satisfied between the first pixel and the respective second pixel whose position corresponds to the position of the first pixel, determining a first processing result of the first pixel as a second processing result of the respective second pixel whose position corresponds to the position of the first pixel.

Optionally, a relative position of each first pixel in the first pixel group is same as a relative position of the respective second pixel in the second pixel group.

Optionally, the preset similarity condition represents that a difference between a pixel value of the first pixel and a pixel value of the respective second pixel whose position corresponds to the position of the first pixel is within a predetermined range.

Optionally, the image processing method further includes: after extracting the first pixel group and the second pixel group in the input image,
  in the case that there is a second target pixel, adjusting operating frequency of an image processing device for processing the second target pixels according to the number of the second target pixels and degree of similarity of the second target pixels;

wherein the second target pixel is a second pixel, and the preset similarity condition is not satisfied between the first pixel and the respective second target pixel whose position corresponds to the position of the first pixel.

Optionally, extracting the first pixel group and the second pixel group in the input image includes:
  generating a pixel selection window;
  caching data of the pixels in N rows in the input image, wherein N is an integer, and a value of N is equal to a row size of the pixel selection window;
  selecting, through the pixel selection window, the pixels in M columns from the data of the pixels in the N rows as the first pixel group, wherein M is an integer, and a value of M is same as a column size of the pixel selection window; and
  controlling the pixel selection window to slide M columns in a preset direction, and selecting the pixels in the M columns from the data of the pixels in the N rows as the second pixel group.

Optionally, in the case that the preset similarity condition is satisfied between the first pixel and the respective second pixel whose position corresponds to the position of the first pixel, determining the first processing result of the first pixel as the second processing result of the respective second pixel whose position corresponds to the position of the first pixel includes:
  acquiring a pixel value of each of the first pixels and a pixel value of each of the second pixels;
  in the case that the pixel value of each of the first pixels is equal to the pixel value of the respective second pixel whose position corresponds to the position of the first pixel, determining the first processing result of the first pixel as the second processing result of the respective second pixel whose position corresponds to the position of the first pixel.

Optionally, the number of the second target pixels is four, and in the case that there is the second target pixel, adjusting the operating frequency of the image processing device for processing the second target pixels according to the number of the second target pixels and the degree of the similarity of the second target pixels includes:
  in the case that formats of all of the second target pixels are same, processing the second target pixel at a default operating frequency of the image processing device;
  in the case that there are three pixels with the same format in the second target pixels or there are two pairs of pixels each with the same format in the second target pixels, processing the second target pixels at a first operating frequency of the image processing device, wherein the first operating frequency is twice the default operating frequency;
  in the case that there are only two pixels with the same format in the second target pixels, processing the second target pixels at a second operating frequency of the image processing device, wherein the second operating frequency is three times the default operating frequency; and
  in the case that the formats of all of the second target pixels are different from each other, processing the second target pixels at a third operating frequency of the image processing device, wherein the third operating frequency is four times the default operating frequency.

In a second aspect, embodiments of the present disclosure provide an image processing device, which includes:
  an acquisition circuit, configured to acquire an input image;

an extraction circuit, configured to extract a first pixel group and a second pixel group in the input image, wherein the first pixel group includes a plurality of first pixels whose positions are different from each other, and the second pixel group includes a plurality of second pixels whose positions are different from each other, the positions of the first pixels are different from the positions of the second pixels, the number of the first pixels are equal to the number of the second pixels, and the position of each first pixel in the first pixel group corresponds to the position of a respective second pixel in the second pixel group; and a processing circuit, configured to determine, in the case that a preset similarity condition is satisfied between the first pixel and the respective second pixel whose position corresponds to the position of the first pixel, a first processing result of the first pixel as a second processing result of the respective second pixel whose position corresponds to the position of the first pixel.

Optionally, a relative position of each first pixel in the first pixel group is same as a relative position of the respective second pixel in the second pixel group.

Optionally, the preset similarity condition represents that a difference between a pixel value of the first pixel and a pixel value of the respective second pixel whose position corresponds to the position of the first pixel is within a predetermined range.

Optionally, the image processing device further includes:

an adjustment circuit, configured to adjust, in the case that there is a second target pixel, operating frequency of an image processing device for processing the second target pixels according to the number of the second target pixels and degree of similarity of the second target pixels, wherein the second target pixel is a second pixel, and the preset similarity condition is not satisfied between the first pixel and the respective second target pixel whose position corresponds to the position of the first pixel.

Optionally, the extraction circuit includes:

a generation sub-circuit, configured to generate a pixel selection window;

a cache sub-circuit, configured to cache data of the pixels in N rows in the input image, wherein N is an integer, and a value of N is equal to a row size of the pixel selection window;

a first selection sub-circuit, configured to select, through the pixel selection window, the pixels in M columns from the data of the pixels in the N rows as the first pixel group, wherein M is an integer, and a value of M is same as a column size of the pixel selection window; and a second selection sub-circuit, configured to control the pixel selection window to slide M columns in a preset direction, and select the pixels in the M columns from the data of the pixels in the N rows as the second pixel group.

Optionally, the processing circuit includes:

a pixel value acquisition sub-circuit, configured to acquire a pixel value of each of the first pixels and a pixel value of each of the second pixels;

a processing sub-circuit, configured to determine, in the case that the pixel value of each of the first pixels is equal to the pixel value of the respective second pixel whose position corresponds to the position of the first pixel, the first processing result of the first pixel as the second processing result of the respective second pixel whose position corresponds to the position of the first pixel.

Optionally, the adjustment circuit is configured to:

in the case that formats of all of the second target pixels are same, process the second target pixel at a default operating frequency of the image processing device;

in the case that there are three pixels with the same format in the second target pixels or there are two pairs of pixels each with the same format in the second target pixels, process the second target pixels at a first operating frequency of the image processing device, wherein the first operating frequency is twice the default operating frequency;

in the case that there are only two pixels with the same format in the second target pixels, process the second target pixels at a second operating frequency of the image processing device, wherein the second operating frequency is three times the default operating frequency; and in the case that the formats of all of the second target pixels are different from each other, process the second target pixels at a third operating frequency of the image processing device, wherein the third operating frequency is four times the default operating frequency.

BRIEF DESCRIPTION OF THE DRAWINGS

In order to illustrate the technical solutions of the present disclosure in a clearer manner, the drawings desired for the present disclosure will be described hereinafter briefly. Obviously, the following drawings merely relate to some embodiments of the present disclosure, and based on these drawings, a person skilled in the art may obtain the other drawings without any creative effort.

DESCRIPTION OF EMBODIMENTS

The present disclosure will be described hereinafter in a clear manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

The present disclosure provides an image processing method.

Figure 1:
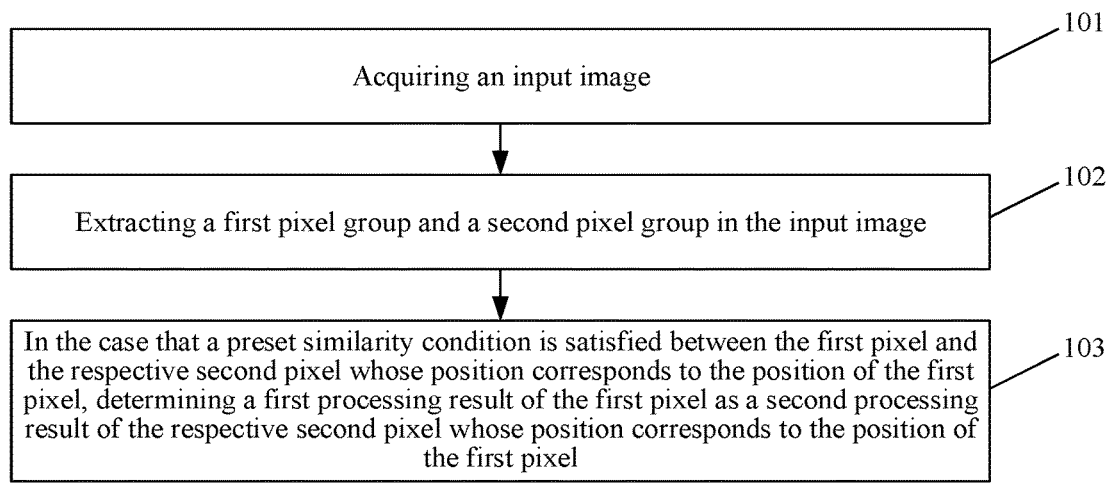
FIG. 1 is a flowchart illustrating an image processing method according to an embodiment of the present disclosure.

As shown in FIG. 1, in an embodiment, the image processing method includes the following step.

Step 101: acquiring an input image;

Step 102: extracting a first pixel group and a second pixel group in the input image.

In this embodiment, the first pixel group comprises a plurality of first pixels whose positions are different from each other, and the second pixel group comprises a plurality of second pixels whose positions are different from each other, the positions of the first pixels are different from the positions of the second pixels, the number of the first pixels are equal to the number of the second pixels.

In an embodiment, the step 102 specifically includes:
generating a pixel selection window;
caching data of the pixels in N rows in the input image, wherein N is an integer, and a value of N is equal to a row size of the pixel selection window;
selecting, through the pixel selection window, the pixels in M columns from the data of the pixels in the N rows as the first pixel group, wherein M is an integer, and a value of M is same as a column size of the pixel selection window; and
controlling the pixel selection window to slide M columns in a preset direction, and selecting the pixels in the M columns from the data of the pixels in the N rows as the second pixel group.

In this embodiment, the pixel selection window for selecting pixels in the pixel group is first established, and the size of the pixel selection window can be set as required.

For example, if the size of the pixel selection window is set as two rows and two columns, four pixels can be selected each time to form the pixel group; if the size of the pixel selection window is set as three rows and three columns, nine pixels can be selected each time to form the pixel group. It should be noted that the size of the pixel groups can be adjusted as required, and the row size and column size of the pixel selection window can be equal or not equal.

In order to improve the processing efficiency of pixels, an on-chip cache can be used in this embodiment to cache the data of the pixels in the N rows in the input image, wherein N is an integer and the value of N is equal to the row size of the pixel selection window.

During the implementation, in the cached data of the pixels in the N rows, pixels are selected by using the pixel selection window to constitute the pixel group. The selection of the pixels can be performed in a preset direction, for example, in a right-to-left direction, or in a left-to-right direction. The present disclosure is not limited thereto.

In the process of selecting pixels by using the pixel selection window, the pixels in the M columns are selected each time, so that a total of M*N pixels are selected in each selection process, and the M*N pixels constitute one pixel group.

After completing the selection of the pixels in the cached data of the pixels in the N rows, the current cache is cleared, and then the data of the pixels in N rows having not been selected is cached, so as to continue the selection of the pixel group.

Figure 2:
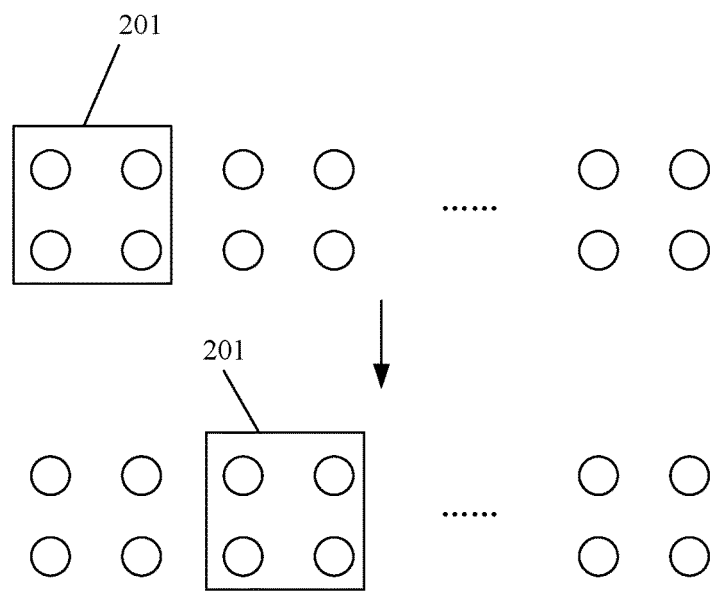
FIG. 2 is a schematic diagram illustrating pixel group selection according to an embodiment of the present disclosure.

As shown in FIG. 2, the pixel selection window 201 is exemplified with a row size of 2 and a column size of 2.

Referring to FIG. 2, during the implementation, the pixels in two rows are firstly cached according to the row size of the pixel selection window 201. Next, pixels in two columns are selected from the cached data of the pixels in two rows, and the selected four pixels constitute the first pixel group.

The pixel selection window is controlled to slide M columns in the preset direction; in this embodiment, when the preset direction is from left to right, M is equal to 2; therefore, sliding the pixel selection window 201 two columns to the right can also be understood as sliding the pixel selection window 201 the length of two pixels to the right, so as to select the second pixel group.

When all the cached pixels in two rows are selected, the cache is cleared, and then pixels in two rows are cached again to select the pixel group, which can also be understood as that, when sliding the pixel selection window to the end of the N rows of pixels, the pixels in two rows are cached again to select the next pixel group. Thus, by repeating the above process, the selection of all pixels in the input image can be achieved, a plurality of pixel groups including pixels in the input image are obtained.

Step 103: in the case that a preset similarity condition is satisfied between the first pixel and the respective second pixel whose position corresponds to the position of the first pixel, determining a first processing result of the first pixel as a second processing result of the respective second pixel whose position corresponds to the position of the first pixel.

In this embodiment, when comparing the first pixels in the first pixel group and the respective second pixels in the second pixel group, the comparison is performed in one-to-one correspondence according to the positional relationship.

Optionally, the position of the first pixel corresponding to the position of the second pixel may represent that a relative position of the first pixel in the first pixel group is the same as a relative position of the second pixel in the second pixel group.

For example, the first pixel group includes four first pixels in two rows and two columns, and the second pixel group includes four second pixels in two rows and two columns. When it determines whether the first pixel and the second pixel satisfy the preset similarity condition, the first pixel and the second pixel are compared in term of positions in the one-to-one correspondence manner. That is, the first pixel located in the upper left corner is compared with the second pixel located in the upper left corner, the first pixel located in the upper right corner is compared with the second pixel located in the upper right corner, and so on.

The preset similarity condition can refer to a difference in pixel values, in other words, a difference between two pixels can be determined as the difference in pixel values in this embodiment. Obviously, the closer the pixel values of two pixels, the higher the similarity of the two pixels.

In an embodiment, the step 103 specifically includes:
acquiring a pixel value of each of the first pixels and a pixel value of each of the second pixels;
in the case that the pixel value of each of the first pixels is equal to the pixel value of the respective second pixel whose position corresponds to the position of the first pixel, determining the first processing result of the first pixel as the second processing result of the respective second pixel whose position corresponds to the position of the first pixel.

In this embodiment, the preset similarity condition is set as that the pixel values are equal. It should be appreciated that, in the case that the pixel value of the first pixel is equal to the pixel value of the second pixel, the processing result of the first pixel is also the same as the processing result of the second pixel, and thus, in this embodiment, when the pixel value of the first pixel and the pixel value of the second pixel whose position corresponds to the position of the first pixel are equal, the first processing result of the first pixel is taken as the second processing result of the second pixel, such that there is no need to individually process the second pixel whose position corresponds to the position of the first pixel during a procedure of processing the pixels in the second pixel group, and the workload is reduced.

In other embodiments, it can also be set that the first pixel and the second pixel are considered to satisfy the preset similarity condition if the difference in pixel values is less than a preset threshold, and the preset threshold can be set to any one of different values as required.

For example, with respect to an image in RGB (Red, Green, and Blue) format with gray scales of 0 to 255, the preset threshold can be set to any one of different values of 1, 2, and 3.

In an embodiment, the preset threshold is set such that the difference in single items of pixel values is less than a first sub-threshold, e.g. 2, and the total difference in pixel values is less than a second sub-threshold, e.g. 3. If the RGB value of the first pixel is (30, 50, 78), and the RGB value of the second pixel whose position corresponds to the position of the first pixel is (31, 50, 78), the differences of the single items of RGB are (1, 0, 0) respectively, and the total difference is 1, therefore, it determines that the first pixel and the second pixel satisfy the preset similarity condition; if the RGB value of the second pixel is (32, 51, 79), the differences of the single items of the RGB are (2, 1, 1) respectively, so that the differences of the single items meet the requirements, but the total difference value is 4, which is greater than the above-mentioned second sub-threshold value; and therefore, the first pixel and the second pixel do not satisfy the preset similarity condition.

In this way, according to the embodiments of the present disclosure, in the case that a preset similarity condition is satisfied between the first pixel in the first pixel group and the respective second pixel whose position corresponds to the position of the first pixel in the second pixel group, a first processing result of the first pixel is determined as a second processing result of the respective second pixel whose position corresponds to the position of the first pixel. As a result, there is no need to independently process the second pixel whose position corresponds to the position of the first pixel, and the workload in the image processing process is reduced.

In an embodiment of the present disclosure, the method may further includes: after the above step 102,
  in the case that there is a second target pixel, adjusting operating frequency for processing the second target pixels according to the number of the second target pixels and degree of similarity of the second target pixels.

In this embodiment, the second target pixel is a second pixel, and the preset similarity condition is not satisfied between the first pixel and the respective second target pixel whose position corresponds to the position of the first pixel. As a result, the second target pixel needs to be individually processed so as to obtain the processing result thereof. The processing result of the first pixel may not be determined as the processing result of the second pixel whose position corresponds to the position of the first pixel.

In this embodiment, the operating frequency at which the second target pixel is processed is adjusted according to the degree of similarity among the plurality of second target pixels.

In this embodiment, the degree of similarity among the plurality of second target pixels can also be determined according to the pixel values. It can be understood that the input image can be a complete image showing a certain content, and due to the continuity of the image content, when a certain local feature of the image is examined in term of a pixel level, there can be pixels whose pixel values are equal.

In this embodiment, the preset condition can be set such that the pixel values of the pixels are equal, or the preset condition can be set such that the difference in the pixel values is less than the preset threshold value, and the pixel values of the second pixels are considered to determine the degree of similarity of the second target pixels.

An example will be provided with the number of second target pixels in the second pixel group being four.

Figure 3:
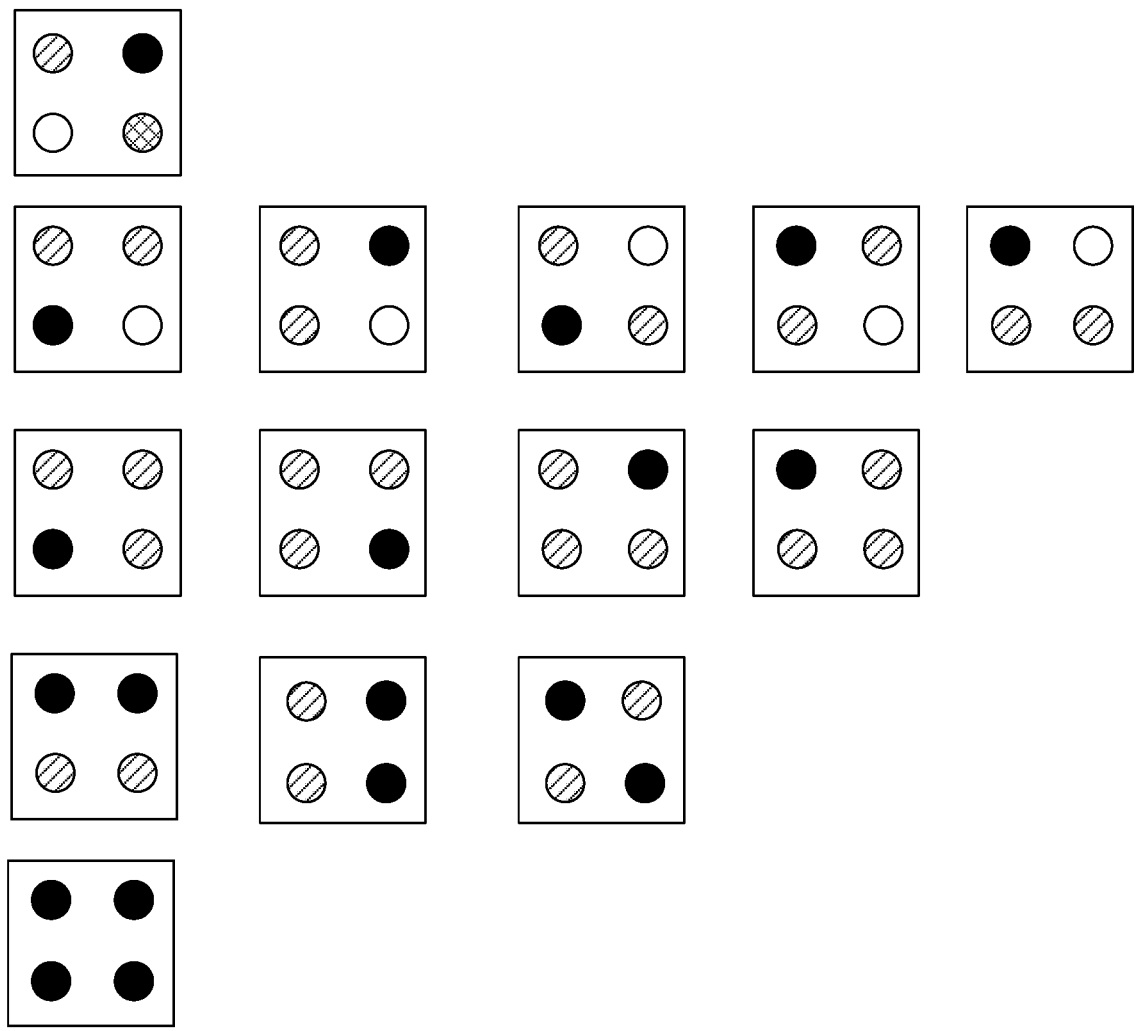
FIG. 3 is a schematic diagram illustrating arrangement of pixels in a pixel group according to an embodiment of the present disclosure.

As shown in FIG. 3, the four circles in each box in FIG. 3 represent four second target pixels in one second pixel group, and different filling manners of the circles represent different pixel values of the second target pixels.

The first row in FIG. 3 represents that the formats of the four second target pixels are different from each other, wherein the second target pixels are of four types of different pixel values.

The second row in FIG. 3 represents that there are two pixels of the same format, wherein the second target pixels are of three types of different pixel values, and there can be five positional relationships between the two pixels of the same format.

In FIG. 3, the third row and the fourth row represent that the pixels are in two formats, wherein the third row represents the pixel arrangements where three pixels are in the same format, and the fourth row represents the pixel arrangements where each of two pairs of pixels is the same format, and the second target pixels are of two types of pixel values in total.

In the fifth row in FIG. 3, the four pixels is in the same format, that is, the second target pixels are of one type of pixel value.

In this embodiment, the pixels with the same pixel value are defined as the pixels in one format. It should be appreciated that the processing results of the second target pixels with the same pixel value are the same, and therefore, for a plurality of second target pixels with the same pixel value, only one of the second target pixels needs to be processed to obtain the processing results of these second target pixels. In other words, for the pixels with the same format, only one of the pixels needs to be processed to obtain the processing results of all the pixels.

It should be noted that, the more the number of formats of pixels, the more the amount of workload, and in order to ensure the efficiency of processing the image, in this embodiment, the processing frequency is adjusted according to the number of formats of pixels, and the processing frequency can be operating frequency of a processor or a chip performing an image processing task.

When the number of formats of the second target pixels increases, the operating frequency for processing the second target pixels may be adjusted to be higher.

In an embodiment, the number of the second target pixels is four, and in the case that there is the second target pixel, adjusting the operating frequency for processing the second target pixels according to the number of the second target pixels and the degree of the similarity of the second target pixels comprises:
  in the case that formats of all of the second target pixels are same, processing the second target pixel at a default operating frequency;

in the case that there are three pixels with the same format in the second target pixels or there are two pairs of pixels each with the same format in the second target pixels, processing the second target pixels at a first operating frequency, wherein the first operating frequency is twice the default operating frequency;

in the case that there are only two pixels with the same format in the second target pixels, processing the second target pixels at a second operating frequency, wherein the second operating frequency is three times the default operating frequency; and in the case that the formats of all of the second target pixels are different from each other, processing the second target pixels at a third operating frequency, wherein the third operating frequency is four times the default operating frequency.

In the first case, the pixel values of the four second target pixels are all the same, and the processing results thereof are all the same; therefore, the image processing chip can be controlled to process the second target pixel at the default frequency, and when the processing is performed, it is only necessary to obtain the processing result of one second target pixel, and the processing results of other second target pixels are all the same as the processing result of the one second target pixel, and the processing result of the one second target pixel can be directly taken as the processing result of each of the other second target pixels.

When the total number of the second target pixels changes, if the pixel values of the second target pixels are same, one second target pixel can also be processed at the default frequency, and after obtaining the processing result of the one second target pixel, the processing result of the one second target pixel is regarded as the processing result of each second target pixel.

In the second case, there are three pixels with the same pixel value or two pairs of pixels each with the same pixel value among the four second target pixels, that is to say, the four second target pixels are of two types of pixel values, therefore, two second target pixels need to be processed to obtain the processing results of the two second target pixels with the two types of pixel values and use a respective one of such processing results as the processing results of the pixels with the same pixel value.

At this time, the operating frequency for processing the second target pixels is adjusted to be the first operating frequency, and the second target pixels with the two types of pixel values are sequentially processed, wherein the first frequency is twice the default frequency; therefore, the actual processing time in the second case is substantially the same as the actual processing time in the first case.

In the third case, there are two second target pixels with the same pixel value among the four second target pixels, that is, the four second target pixels are of three types of pixel values, and therefore, three second target pixels need to be processed to obtain the processing results of the second target pixels with the three types of pixel values.

At this time, the operating frequency for processing the second target pixels is adjusted to be the second frequency, and pixels with three types of pixel values are processed sequentially, wherein the second frequency is three times the default frequency, and therefore, the actual processing time in the third case is substantially the same as the actual processing time in the first case.

In the fourth case, the pixel values of the four second target pixels are all different, that is to say, there are pixels with four types of pixel values, and the four second target pixels need to be processed to obtain the processing results of the second target pixels with the four types of pixel values.

Similar to the above-mentioned process, the operating frequency for processing the second target pixels is adjusted to be the third frequency, and pixels with four types of pixel values are processed sequentially, wherein the third frequency is four times of the default frequency, therefore, the actual processing time in the fourth case is substantially the same as the actual processing time in the first case.

The technical solution of this embodiment can be summarized as: determining the number of different pixel values of the second target pixels, which is denoted as K, and adjusting the operating frequency for processing the second target pixels to be K times of the default frequency, therefore the speed for processing the pixels in the first pixel group is increased. Thus, in the technical solution of this embodiment, the processing of the plurality of second target pixels can be completed in substantially the same time, and the image processing efficiency is increased.

Further, in some embodiments, the highest frequency of the image processing chip or processor is constant, therefore, the highest image processing speed that can be provided is also constant, and if the maximum operating efficiency cannot reach K times of the default efficiency, a plurality of frequency levels can be set according to the number of pixel formats.

For example, the default operating frequency for image processing is F1, the maximum operating frequency for image processing is F2, the number of pixels in each pixel group is X, and accordingly, the number of pixel formats in each pixel group is at most X.

Next, X frequency levels of the operating frequency for image processing are set, for example, the operating frequency F1 corresponds to the frequency level L1 and the operating frequency F2 corresponds to the frequency level LX, and then X-2 operating frequency levels between F1 and F2 are set, which are denoted as L2, L3, . . . , LX-1, respectively.

When the number of pixel values of the second target pixels in the pixel group is x (x is an integer greater than or equal to 1, and less than or equal to X), the operating frequency for image processing is adjusted to be Lx to increase the processing speed for the pixels in the first pixel group.

It should be appreciated that the above-mentioned operating frequencies can be operating frequency of an image processing chip or a processor, and the embodiments are provided with the operating frequency of the image processing chip. The operating frequency of the image processing chip is generated by a PLL (Phase Locked Loop) of the image processing chip via an associated clock signal, and therefore the clock signal only functions inside the image processing chip, and may not adversely affect or interfere with other structures or elements of the display device.

During the operation of the image processing chip, the adjustment period of each operating frequency is the processing period of pixels in the pixel group, and therefore, sufficient time is reserved for the adjustment delay for the operating frequency.

Figure 4:
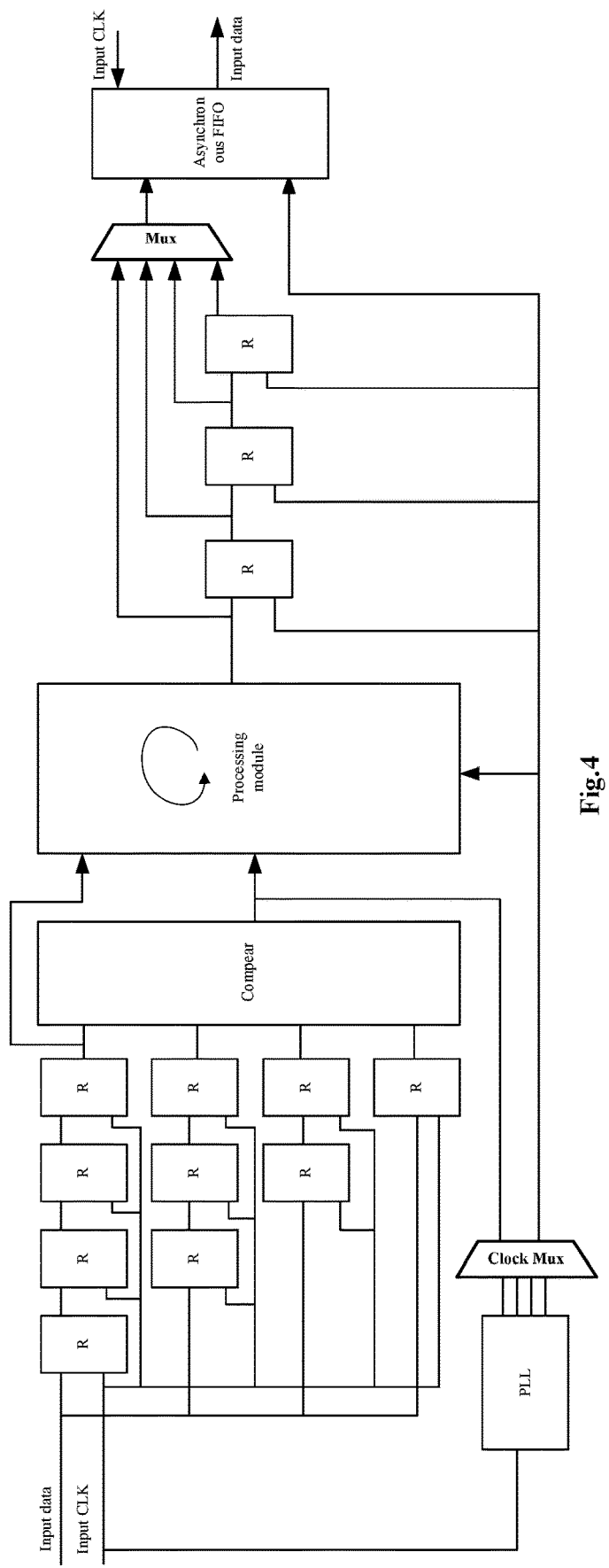
FIG. 4 is a schematic diagram illustrating image processing logic according to an embodiment of the present disclosure.

As shown in FIG. 4, the specific implementation process of the technical solution of this embodiment can be summarized as: inputting raw data including input data and the associated clock signal (Input CLK) generated by the PLL into a group of registers to form four signals, wherein the input data includes pixel data in one pixel group and the register group can include a plurality of register units R.

The register group generates four signals, the four signals are input to a comparing circuit for generating a comparison result of pixel formats in the pixel group, which can be understood as generating the degree of similarity described above.

Furthermore, the generated comparison result and the raw data are input into a processing circuit, and the processing circuit performs corresponding processing according to the mutual relationship of the pixels in the pixel group, at the same time, a clock signal multiplexer (clock Mux) generates a corresponding frequency multiplication clock, namely, the clock frequency determined according to the number of pixel formats in the first pixel group in the above-mentioned embodiment.

Then, through the register group, the processed results of four pixels are sent into an asynchronous FIFO (First In First Out) circuit via a multiplexer (MUX) in serial, and finally, are forwarded to the next stage circuit by the asynchronous FIFO circuit, so that the processing of pixels in the pixel group is completed, that is, the above-mentioned first processing result is output.

Embodiments of the present disclosure provide an image processing device applied to the above image processing chip.

Figure 5:
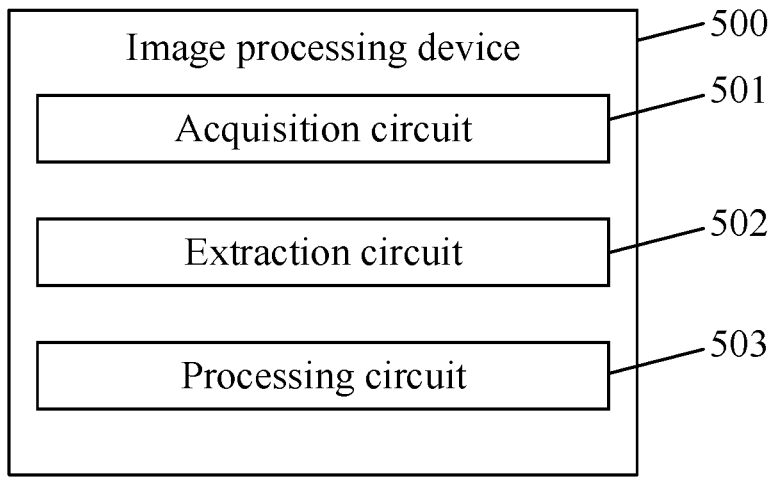
FIG. 5 is a structural diagram illustrating an image processing device according to an embodiment of the present disclosure.

As shown in FIG. 5, in an embodiment, the image processing device 500 includes:
- an acquisition circuit 501, configured to acquire an input image;
- an extraction circuit 502, configured to extract a first pixel group and a second pixel group in the input image, wherein the first pixel group comprises a plurality of first pixels, and the second pixel group comprises a plurality of second pixels, the positions of the first pixels are different from the positions of the second pixels, the number of the first pixels are equal to the number of the second pixels; and
- a processing circuit 503, configured to determine, in the case that a preset similarity condition is satisfied between the first pixel and the respective second pixel whose position corresponds to the position of the first pixel, a first processing result of the first pixel as a second processing result of the respective second pixel whose position corresponds to the position of the first pixel.

Figure 6:
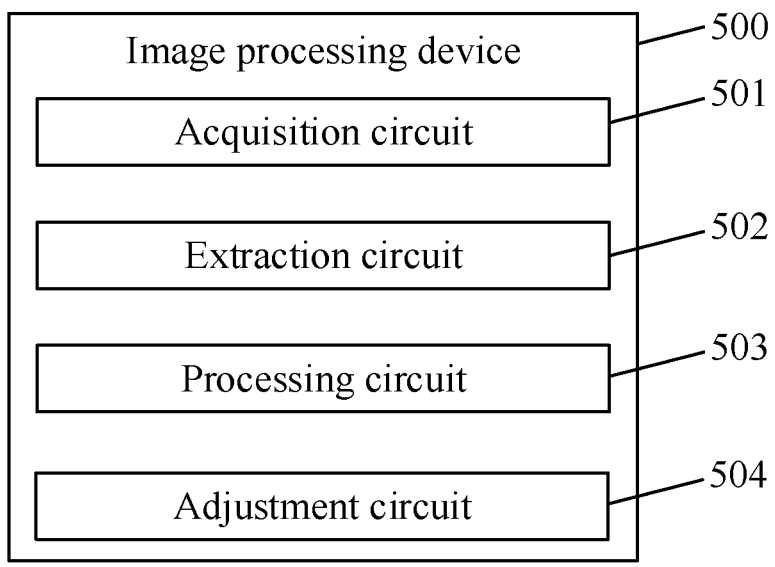
FIG. 6 is a structural diagram illustrating an image processing device according to another embodiment of the present disclosure.

As shown in FIG. 6, in some embodiments, the image processing device 500 further includes:
- an adjustment circuit 504, configured to adjust, in the case that there is a second target pixel, operating frequency of an image processing device for processing the second target pixels according to the number of the second target pixels and degree of similarity of the second target pixels;
- wherein the second target pixel is a second pixel, and the preset similarity condition is not satisfied between the first pixel and the respective second target pixel whose position corresponds to the position of the first pixel.

Figure 7:
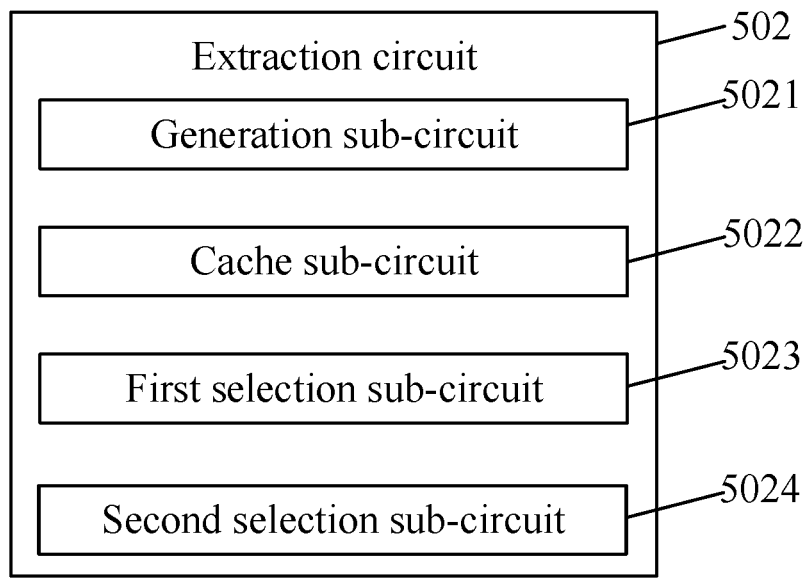
FIG. 7 is a structural diagram illustrating an extracting circuit according to an embodiment of the present disclosure.

As shown in FIG. 7, in some embodiments, the extraction circuit 502 includes:
- a generation sub-circuit 5021, configured to generate a pixel selection window;
- a cache sub-circuit 5022, configured to cache data of the pixels in N rows in the input image, wherein N is an integer, and a value of N is equal to a row size of the pixel selection window;
- a first selection sub-circuit 5023, configured to select, through the pixel selection window, the pixels in M columns from the data of the pixels in the N rows as the first pixel group, wherein M is an integer, and a value of M is same as a column size of the pixel selection window; and
- a second selection sub-circuit 5024, configured to control the pixel selection window to slide M columns in a preset direction, and select the pixels in the M columns from the data of the pixels in the N rows as the second pixel group.

Figure 8:
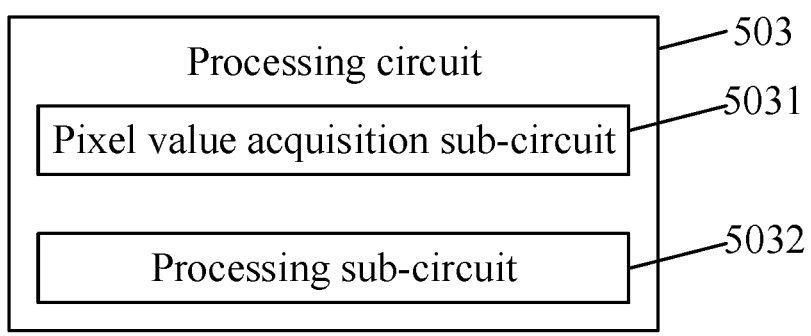
FIG. 8 is a structural diagram illustrating a processing circuit according to an embodiment of the present disclosure.

As shown in FIG. 8, in some embodiments, the processing circuit 503 includes:
- a pixel value acquisition sub-circuit 5031, configured to configured to acquire a pixel value of each of the first pixels and a pixel value of each of the second pixels; and
- a processing sub-circuit 5032, configured to determine, in the case that the pixel value of each of the first pixels is equal to the pixel value of the respective second pixel whose position corresponds to the position of the first pixel, the first processing result of the first pixel as the second processing result of the respective second pixel whose position corresponds to the position of the first pixel.

In some embodiments, the adjustment circuit 504 is configured to:
- in the case that formats of all of the second target pixels are same, process the second target pixel at a default frequency;
- in the case that there are three pixels with the same format in the second target pixels or there are two pairs of pixels each with the same format in the second target pixels, process the second target pixels at a first frequency, wherein the first frequency is twice the default frequency;
- in the case that there are only two pixels with the same format in the second target pixels, process the second target pixels at a second frequency, wherein the second frequency is three times the default frequency; and
- in the case that the formats of all of the second target pixels are different from each other, process the second target pixels at a third frequency, wherein the third frequency is four times the default frequency.

In an embodiment of the present disclosure, the image processing device is capable of implementing the steps of the above-described image processing method and achieving substantially the same or similar technical effects, and will not be described in further detail herein.

The above embodiments are for illustrative purposes only, but the present disclosure is not limited thereto. It should be appreciated that a person skilled in the art may make further modifications and improvements without departing from the spirit of the present disclosure, and these modifications and improvements shall also fall within the scope of the present disclosure.

What is claimed is:

1. An image processing method, comprising:
   acquiring an input image;
   extracting a first pixel group and a second pixel group in the input image, wherein the first pixel group comprises a plurality of first pixels whose positions are different from each other, and the second pixel group comprises a plurality of second pixels whose positions are different from each other, the positions of the first pixels are different from the positions of the second pixels, the number of the first pixels are equal to the number of the second pixels, and the position of each first pixel in the first pixel group corresponds to the position of a respective second pixel in the second pixel group; and in the case that a preset similarity condition is satisfied between the first pixel and the respective second pixel whose position corresponds to the position of the first pixel, determining a first processing result of the first pixel as a second processing result of the respective second pixel whose position corresponds to the position of the first pixel.

2. The image processing method according to claim 1, wherein a relative position of each first pixel in the first pixel group is same as a relative position of the respective second pixel in the second pixel group.

3. The image processing method according to claim 1, wherein the preset similarity condition represents that a difference between a pixel value of the first pixel and a pixel value of the respective second pixel whose position corresponds to the position of the first pixel is within a predetermined range.

4. The image processing method according to claim 1, further comprising: after extracting the first pixel group and the second pixel group in the input image,
in the case that there is a second target pixel, adjusting operating frequency of an image processing device for processing the second target pixels according to the number of the second target pixels and degree of similarity of the second target pixels;
wherein the second target pixel is a second pixel, and the preset similarity condition is not satisfied between the first pixel and the respective second target pixel whose position corresponds to the position of the first pixel.

5. The image processing method according to claim 1, wherein the extracting the first pixel group and the second pixel group in the input image comprises:
generating a pixel selection window;
caching data of the pixels in N rows in the input image, wherein N is an integer, and a value of N is equal to a row size of the pixel selection window;
selecting, through the pixel selection window, the pixels in M columns from the data of the pixels in the N rows as the first pixel group, wherein M is an integer, and a value of M is same as a column size of the pixel selection window; and
controlling the pixel selection window to slide M columns in a preset direction, and selecting the pixels in the M columns from the data of the pixels in the N rows as the second pixel group.

6. The image processing method according to claim 1, wherein in the case that the preset similarity condition is satisfied between the first pixel and the respective second pixel whose position corresponds to the position of the first pixel, determining the first processing result of the first pixel as the second processing result of the respective second pixel whose position corresponds to the position of the first pixel comprises:
acquiring a pixel value of each of the first pixels and a pixel value of each of the second pixels;
in the case that the pixel value of each of the first pixels is equal to the pixel value of the respective second pixel whose position corresponds to the position of the first pixel, determining the first processing result of the first pixel as the second processing result of the respective second pixel whose position corresponds to the position of the first pixel.

7. The image processing method according to claim 4, wherein the number of the second target pixels is four, and in the case that there is the second target pixel, adjusting the operating frequency of the image processing device for processing the second target pixels according to the number of the second target pixels and the degree of the similarity of the second target pixels comprises:
in the case that formats of all of the second target pixels are same, processing the second target pixel at a default operating frequency of the image processing device;
in the case that there are three pixels with the same format in the second target pixels or there are two pairs of pixels each with the same format in the second target pixels, processing the second target pixels at a first operating frequency of the image processing device, wherein the first operating frequency is twice the default operating frequency;
in the case that there are only two pixels with the same format in the second target pixels, processing the second target pixels at a second operating frequency of the image processing device, wherein the second operating frequency is three times the default operating frequency; and
in the case that the formats of all of the second target pixels are different from each other, processing the second target pixels at a third operating frequency of the image processing device, wherein the third operating frequency is four times the default operating frequency.

8. The image processing method according to claim 4, wherein the extracting a first pixel group and a second pixel group in the input image comprises:
generating a pixel selection window;
caching data of the pixels in N rows in the input image, wherein N is an integer, and a value of N is equal to a row size of the pixel selection window;
selecting, through the pixel selection window, the pixels in M columns from the data of the pixels in the N rows as the first pixel group, wherein M is an integer, and a value of M is same as a column size of the pixel selection window; and
controlling the pixel selection window to slide M columns in a preset direction, and selecting the pixels in the M columns from the data of the pixels in the N rows as the second pixel group.

9. The image processing method according to claim 4, wherein in the case that the preset similarity condition is satisfied between the first pixel and the respective second pixel whose position corresponds to the position of the first pixel, determining the first processing result of the first pixel as the second processing result of the respective second pixel whose position corresponds to the position of the first pixel comprises:
acquiring a pixel value of each of the first pixels and a pixel value of each of the second pixels;
in the case that the pixel value of each of the first pixels is equal to the pixel value of the respective second pixel whose position corresponds to the position of the first pixel, determining the first processing result of the first pixel as the second processing result of the respective second pixel whose position corresponds to the position of the first pixel.

10. The image processing method according to claim 5, wherein the number of the second target pixels is four, and in the case that there is the second target pixel, adjusting the operating frequency of the image processing device for processing the second target pixels according to the number of the second target pixels and the degree of the similarity of the second target pixels comprises:
in the case that formats of all of the second target pixels are same, processing the second target pixel at a default operating frequency of the image processing device;

in the case that there are three pixels with the same format in the second target pixels or there are two pairs of pixels each with the same format in the second target pixels, processing the second target pixels at a first operating frequency of the image processing device, wherein the first operating frequency is twice the default operating frequency;

in the case that there are only two pixels with the same format in the second target pixels, processing the second target pixels at a second operating frequency of the image processing device, wherein the second operating frequency is three times the default operating frequency; and in the case that the formats of all of the second target pixels are different from each other, processing the second target pixels at a third operating frequency of the image processing device, wherein the third operating frequency is four times the default operating frequency.

11. An image processing device, comprising:
an acquisition circuit, configured to acquire an input image;
an extraction circuit, configured to extract a first pixel group and a second pixel group in the input image, wherein the first pixel group comprises a plurality of first pixels whose positions are different from each other, and the second pixel group comprises a plurality of second pixels whose positions are different from each other, the positions of the first pixels are different from the positions of the second pixels, the number of the first pixels are equal to the number of the second pixels, and the position of each first pixel in the first pixel group corresponds to the position of a respective second pixel in the second pixel group; and
a processing circuit, configured to determine, in the case that a preset similarity condition is satisfied between the first pixel and the respective second pixel whose position corresponds to the position of the first pixel, a first processing result of the first pixel as a second processing result of the respective second pixel whose position corresponds to the position of the first pixel.

12. The image processing device according to claim 11, wherein a relative position of each first pixel in the first pixel group is same as a relative position of the respective second pixel in the second pixel group.

13. The image processing device according to claim 11, wherein the preset similarity condition represents that a difference between a pixel value of the first pixel and a pixel value of the respective second pixel whose position corresponds to the position of the first pixel is within a predetermined range.

14. The image processing device according to claim 11, further comprising:
an adjustment circuit, configured to adjust, in the case that there is a second target pixel, operating frequency of an image processing device for processing the second target pixels according to the number of the second target pixels and degree of similarity of the second target pixels,
wherein the second target pixel is a second pixel, and the preset similarity condition is not satisfied between the first pixel and the respective second target pixel whose position corresponds to the position of the first pixel.

15. The image processing device according to claim 11, wherein the extraction circuit comprises:
a generation sub-circuit, configured to generate a pixel selection window;
a cache sub-circuit, configured to cache data of the pixels in N rows in the input image, wherein N is an integer, and a value of N is equal to a row size of the pixel selection window;
a first selection sub-circuit, configured to select, through the pixel selection window, the pixels in M columns from the data of the pixels in the N rows as the first pixel group, wherein M is an integer, and a value of M is same as a column size of the pixel selection window; and
a second selection sub-circuit, configured to control the pixel selection window to slide M columns in a preset direction, and select the pixels in the M columns from the data of the pixels in the N rows as the second pixel group.

16. The image processing device according to claim 11, wherein the processing circuit comprises:
a pixel value acquisition sub-circuit, configured to acquire a pixel value of each of the first pixels and a pixel value of each of the second pixels;
a processing sub-circuit, configured to determine, in the case that the pixel value of each of the first pixels is equal to the pixel value of the respective second pixel whose position corresponds to the position of the first pixel, the first processing result of the first pixel as the second processing result of the respective second pixel whose position corresponds to the position of the first pixel.

17. The image processing device according to claim 14, wherein the adjustment circuit is configured to:
in the case that formats of all of the second target pixels are same, process the second target pixel at a default operating frequency of the image processing device;
in the case that there are three pixels with the same format in the second target pixels or there are two pairs of pixels each with the same format in the second target pixels, process the second target pixels at a first operating frequency of the image processing device, wherein the first operating frequency is twice the default operating frequency;
in the case that there are only two pixels with the same format in the second target pixels, process the second target pixels at a second operating frequency of the image processing device, wherein the second operating frequency is three times the default operating frequency; and
in the case that the formats of all of the second target pixels are different from each other, process the second target pixels at a third operating frequency of the image processing device, wherein the third operating frequency is four times the default operating frequency.

18. The image processing device according to claim 14, wherein the extraction circuit comprises:
a generation sub-circuit, configured to generate a pixel selection window;
a cache sub-circuit, configured to cache data of the pixels in N rows in the input image, wherein N is an integer, and a value of N is equal to a row size of the pixel selection window;
a first selection sub-circuit, configured to select, through the pixel selection window, the pixels in M columns from the data of the pixels in the N rows as the first pixel group, wherein M is an integer, and a value of M is same as a column size of the pixel selection window; and
a second selection sub-circuit, configured to control the pixel selection window to slide M columns in a preset direction, and select the pixels in the M columns from the data of the pixels in the N rows as the second pixel group.

19. The image processing device according to claim 14, wherein the processing circuit comprises:
   a pixel value acquisition sub-circuit, configured to acquire a pixel value of each of the first pixels and a pixel value of each of the second pixels;
   a processing sub-circuit, configured to determine, in the case that the pixel value of each of the first pixels is equal to the pixel value of the respective second pixel whose position corresponds to the position of the first pixel, the first processing result of the first pixel as the second processing result of the respective second pixel whose position corresponds to the position of the first pixel.

20. The image processing device according to claim 15, wherein the adjustment circuit is specifically configured to:
   in the case that formats of all of the second target pixels are same, process the second target pixel at a default operating frequency of the image processing device;
   in the case that there are three pixels with the same format in the second target pixels or there are two pairs of pixels each with the same format in the second target pixels, process the second target pixels at a first operating frequency of the image processing device, wherein the first operating frequency is twice the default operating frequency;
   in the case that there are only two pixels with the same format in the second target pixels, process the second target pixels at a second operating frequency of the image processing device, wherein the second operating frequency is three times the default operating frequency; and
   in the case that the formats of all of the second target pixels are different from each other, process the second target pixels at a third operating frequency of the image processing device, wherein the third operating frequency is four times the default operating frequency.

* * * * *